(12) United States Patent
Hayashi et al.

(10) Patent No.: US 7,778,224 B2
(45) Date of Patent: Aug. 17, 2010

(54) CDMA/TDD MOBILE COMMUNICATION SYSTEM AND METHOD

(75) Inventors: Masaki Hayashi, Yokosuka (JP); Kazuyuki Miya, Kawasaki (JP); Toyoki Ue, Yokosuka (JP); Katsuhiko Hiramatsu, Yokosuka (JP)

(73) Assignee: Panasonic Corporation, Osaka (JP)

(*) Notice: Subject to any disclaimer, the term of this patent is extended or adjusted under 35 U.S.C. 154(b) by 1134 days.

(21) Appl. No.: 10/885,684

(22) Filed: Jul. 8, 2004

(65) Prior Publication Data

US 2005/0002349 A1    Jan. 6, 2005

Related U.S. Application Data

(60) Continuation of application No. 10/166,268, filed on Jun. 11, 2002, now Pat. No. 6,807,162, which is a division of application No. 09/264,826, filed on Mar. 9, 1999, now Pat. No. 6,611,509.

(30) Foreign Application Priority Data

Mar. 10, 1998  (JP) ................................. 10-78317

(51) Int. Cl.
H04B 7/216 (2006.01)
(52) U.S. Cl. ..................... 370/335; 370/441; 370/458
(58) Field of Classification Search ................. 370/332, 370/335–337, 342, 345, 347–350, 441, 458
See application file for complete search history.

(56) References Cited

U.S. PATENT DOCUMENTS 5,231,634 A * 7/1993 Giles et al. ................. 370/348

(Continued)

FOREIGN PATENT DOCUMENTS

DE    2268365    1/1994

(Continued)

OTHER PUBLICATIONS

Time division multiple access methods for wireless personal communications; Falconer, F Adachi, B Gudmundson—IEEE Communications 1995.*

(Continued)

*Primary Examiner*—Salman Ahmed
(74) *Attorney, Agent, or Firm*—Greenblum & Bernstein, P.L.C.

(57) ABSTRACT

A mobile station apparatus in a CDMA/TDD mobile communication system employs a communication frame including a plurality of time slots. The time slots include a plurality of forward link time slots, disposed at regular intervals in the communication frame and assigned a common control channel. The time slots further include time slots other than the plurality of forward link time slots, divided into reverse link time slots and forward link time slots according to an amount of information on a forward link and on a reverse link. The mobile station apparatus includes a receiver that receives the communication frame including the plurality of time slots. A measurer measures individual reception qualities of the plurality of forward link time slots in the received communication frame including the forward link time slots assigned the common control channel. A weighter assigns a weight to each measured reception quality of the plurality of forward time slots. A transmission power controller performs transmission power control for reverse link time slots according to individual reception qualities of weighted forward link time slots.

5 Claims, 10 Drawing Sheets

U.S. PATENT DOCUMENTS

| | | | |
|---|---|---|---|
| 5,265,119 A | 11/1993 | Gilhousen et al. | |
| 5,353,342 A * | 10/1994 | Pietrowicz | 379/257 |
| 5,371,734 A * | 12/1994 | Fischer | 370/311 |
| 5,377,192 A | 12/1994 | Goodings et al. | |
| 5,410,568 A | 4/1995 | Schilling | |
| 5,510,794 A * | 4/1996 | Asbury et al. | 342/42 |
| 5,519,774 A * | 5/1996 | Battista et al. | 379/386 |
| 5,689,502 A * | 11/1997 | Scott | 370/281 |
| 5,697,066 A * | 12/1997 | Acampora | 455/466 |
| 5,732,073 A * | 3/1998 | Kusaki et al. | 370/280 |
| 5,732,076 A * | 3/1998 | Ketseoglou et al. | 370/347 |
| 5,745,484 A * | 4/1998 | Scott | 370/347 |
| 5,793,759 A * | 8/1998 | Rakib et al. | 370/342 |
| 5,802,046 A * | 9/1998 | Scott | 370/280 |
| 5,805,581 A * | 9/1998 | Uchida et al. | 370/335 |
| 5,812,766 A * | 9/1998 | Osawa | 709/230 |
| 5,914,947 A * | 6/1999 | Saito | 370/337 |
| 5,943,362 A * | 8/1999 | Saito | 375/143 |
| 5,959,980 A * | 9/1999 | Scott | 370/280 |
| 5,987,023 A * | 11/1999 | Albrow et al. | 370/350 |
| 6,002,947 A * | 12/1999 | Smith | 455/562.1 |
| 6,005,854 A * | 12/1999 | Xu et al. | 370/335 |
| 6,016,311 A * | 1/2000 | Gilbert et al. | 370/280 |
| 6,049,538 A * | 4/2000 | Scott | 370/347 |
| 6,069,884 A * | 5/2000 | Hayashi et al. | 370/335 |
| 6,094,421 A * | 7/2000 | Scott | 370/280 |
| 6,097,707 A | 8/2000 | Hodzic et al. | |
| 6,101,176 A * | 8/2000 | Honkasalo et al. | 370/335 |
| 6,101,179 A * | 8/2000 | Soliman | 370/342 |
| 6,130,886 A * | 10/2000 | Ketseoglou et al. | 370/347 |
| 6,144,650 A | 11/2000 | Watanabe et al. | |
| 6,163,705 A | 12/2000 | Miya | |
| 6,181,945 B1 * | 1/2001 | Lee | 340/7.21 |
| 6,347,231 B1 | 2/2002 | Miya | |
| 6,366,566 B1 * | 4/2002 | Scott | 370/280 |
| 6,388,997 B1 * | 5/2002 | Scott | 370/280 |
| 6,463,295 B1 * | 10/2002 | Yun | 455/522 |
| 6,487,188 B1 * | 11/2002 | Kitade et al. | 370/337 |
| 6,490,257 B1 | 12/2002 | Watanabe et al. | |
| 6,577,617 B1 | 6/2003 | Ue | |
| 6,611,509 B1 * | 8/2003 | Hayashi et al. | 370/335 |
| 6,807,162 B2 * | 10/2004 | Hayashi et al. | 370/335 |
| 6,950,416 B1 * | 9/2005 | Feuerstein et al. | 370/335 |
| 6,973,065 B2 * | 12/2005 | Hayashi et al. | 370/335 |
| 7,035,661 B1 * | 4/2006 | Yun | 455/522 |
| 2001/0030948 A1 * | 10/2001 | Tiedemann, Jr. | 370/305 |
| 2003/0195007 A1 | 10/2003 | Hayashi et al. | |
| 2005/0002349 A1 * | 1/2005 | Hayashi et al. | 370/320 |
| 2005/0265430 A1 * | 12/2005 | Ozluturk et al. | 375/145 |
| 2006/0098669 A1 * | 5/2006 | Enns et al. | 370/401 |
| 2007/0066320 A1 * | 3/2007 | Padovani et al. | 455/450 |
| 2007/0173277 A1 * | 7/2007 | Yun | 455/522 |
| 2009/0052573 A1 * | 2/2009 | Tiedemann et al. | 375/295 |
| 2009/0274240 A1 * | 11/2009 | Oshima | 375/286 |

FOREIGN PATENT DOCUMENTS

| | | |
|---|---|---|
| EP | 0668664 | 8/1994 |
| EP | 0720405 | 7/1996 |
| EP | 0773639 | 11/1997 |
| JP | 6-013956 | 1/1994 |
| JP | 7-107546 | 4/1995 |
| JP | 8-274701 | 10/1996 |
| JP | 9-102768 | 4/1997 |
| JP | 9-261172 | 10/1997 |
| JP | 9-271071 | 10/1997 |
| JP | 10-051424 | 2/1998 |
| JP | 10-056421 | 2/1998 |
| WO | 97/08854 | 3/1997 |

OTHER PUBLICATIONS

Fading channels: information-theoretic and communications aspects Biglieri, E.; Proakis, J.; Shamai, S.; Information Theory, IEEE Transactions on vol. 44 , Issue: 6 Publication Year: 1998.*
English language Abstract of JP 10-051424.
English language Abstract of JP 10-056421.
English language Abstract of JP 6-013956.
English language Abstract of JP 9-261172.
English language Abstract of JP 9-102768.
"TDD-CDMA Extension to FDD-CDMA Based Third Generation Cellular System," by Povey et al., 1997, pp. 813-817.
U.S. Appl. No. 09/359,126 to Ue, which was filed on Jul. 23, 1999.
English Language Abstract of JP 9-271071.
English Language Abstract of JP 8-274701.
English Language Abstract of JP 7-107546.
Horikawa et al., "Performance of Wideband CDMA with TDD Scheme," Asia Pacific Microwave Conference, Hong Kong, vol. 1, Dec. 5, 1997, pp. 145-148.

* cited by examiner

CDMA/TDD MOBILE COMMUNICATION SYSTEM AND METHOD

CROSS-REFERENCE TO RELATED APPLICATION

This application is a continuation of U.S. patent application Ser. No. 10/166,268 filed on Jun. 11, 2002 now U.S. Pat. No. 6,807,162, which is a divisional of U.S. patent application Ser. No. 09/264,826, filed on Mar. 9, 1999 now U.S. Pat. No. 6,611,509, the contents of both being hereby incorporated herein by reference in their entireties.

BACKGROUND OF THE INVENTION

1. Field of the Invention

The present invention relates to a CDMA/TDD mobile communication system and method applying a same band transmission/reception system for assigning time slots at the same radio frequency band to communicate over a reverse link and a forward link alternately.

2. Description of the Invention

Conventionally, as a mobile communication system using a CDMA (Code Division Multiple Access) system, a W-CDMA (Wideband CDMA) system using a DS (Direct Sequence) system is known. The W-CDMA system uses a FDD (Frequency Division Duplex) system as a duplex system.

As a duplex system, a TDD (Time Division Duplex) system is known other than the FDD. The TDD system uses a same band transmission/reception system for assigning time slots at the same radio frequency band to communicate a reverse link and a forward link alternately, which is also called Ping-Pong system.

In addition, a multiple access system is a line connection system over which a plurality of stations concurrently communicate at the same frequency band. The CDMA system employs a technique for performing a multiple access by a spread spectrum communication in which information signals are spread by a spreading code to transmit over a spread band. In the DS system, information signals are multiplied by a spreading code in spreading.

In the DS-CDMA system, since a plurality of communication links share the same frequency band, there is a problem to control each communication wave level at a reception to be equal (near-far problem). In other words, the conquest over this problem is necessary to achieve the CDMA communication system.

The near-far problem is severer at a reception of a base station for concurrently receiving radio signals transmitted from a plurality of mobile stations (mobile radio terminal devices) each locating at a different place. Therefore, it is mandatory at the mobile station propagation path condition.

In the TDD system, propagation path conditions such as fading correlate when intervals of forward and reverse links are short enough because the same frequency band is used for the forward and reverse links. It is thereby possible to perform a transmission power control by open-loop control.

Some of such CDMA mobile communication system comprises a TDD configuration for dividing a communication frame into a plurality of time slots to assign each of traffic channel and control channel to a time slot to communicate over a plurality of links.

FIG. 1 illustrates a frame diagram in a conventional CDMA/TDD mobile communication system.

FIG. 1 illustrates an example where one frame 1 is divided into eight time slots 0 to 7, time slots 0 to 3 are assigned to a forward link and time slots 4 to 7 are assigned to a reverse link.

In forward link 2 toward a mobile station (not shown) from a base station (not shown), common control channel 3 such as synchronization control channel, a dedicated control channel and user information channel 4 that are transmitted between the base station and a dedicated mobile station are multiplexed. In reverse link 5 toward the base station from the mobile station, the dedicated control channel and user information channel 6 are multiplexed.

The mobile station starts receiving when it is turned on, and acquires synchronization with the base station by detecting the synchronization control channel of common control channel 3 in forward link 2. Then the mobile station performs a line connection via the dedicated control channel to start communicating with user information channel 4. At this point, the mobile station measures reception quality of an assigned forward link time slot, and based on the measurement result, performs a transmission power control of an assigned reverse link time slot.

However, in the conventional CDMA/TDD mobile communication system described above, when an assignment of time slots to forward link and reverse link is changed corresponding to information volume of the forward and reverse links, a configuration of the synchronization control channel becomes irregular. It thereby takes a longer time for a mobile station to acquire synchronization with a base station when it is turned on.

In addition, in each communication link, since an interval of the assigned forward link time slot and the assigned reverse link time slot is long, the propagation path conditions of the forward and reverse links do not correlate so much, thereby decreasing an effect of an open-loop controlled transmission power control.

SUMMARY OF THE INVENTION

It is an object of the present invention to provide a CDMA/TDD mobile communication system and method for enabling a synchronization acquisition time with a base station at a mobile station to be shortened, and enabling open-loop controlled transmission power control to function effectively when an assignment of time slots to forward and reverse links is changed corresponding to an information volume in the case where the information volumes of the forward and reverse links are asymmetry.

The object is achieved by a CDMA/TDD mobile communication system comprising a base station apparatus having a control section for assigning one or more fixed forward link time slots to a plurality of time slots divided at a communication frame at a predetermined interval, while assigning forward link time slots and reverse link time slots to the time slots except for the fixed forward link time slots by allocating the time slots corresponding to a ratio of a total information volume of a forward link to a total information volume of a reverse link in the system, in order to transmit a control channel signal including a synchronization control channel signal using the fixed forward link time slots, and to transmit a traffic channel signal of the forward link and a traffic channel signal of the reverse link respectively using the forward link time slots and the reverse link time slots that are allocated according to the number of time slots respectively required corresponding to the respective information volume.

DETAILED DESCRIPTION OF THE PREFERRED EMBODIMENTS

A CDMA/TDD mobile communication system and method according to the embodiments of the present invention are specifically explained below with reference to attached drawings.

First Embodiment

Figure 1:
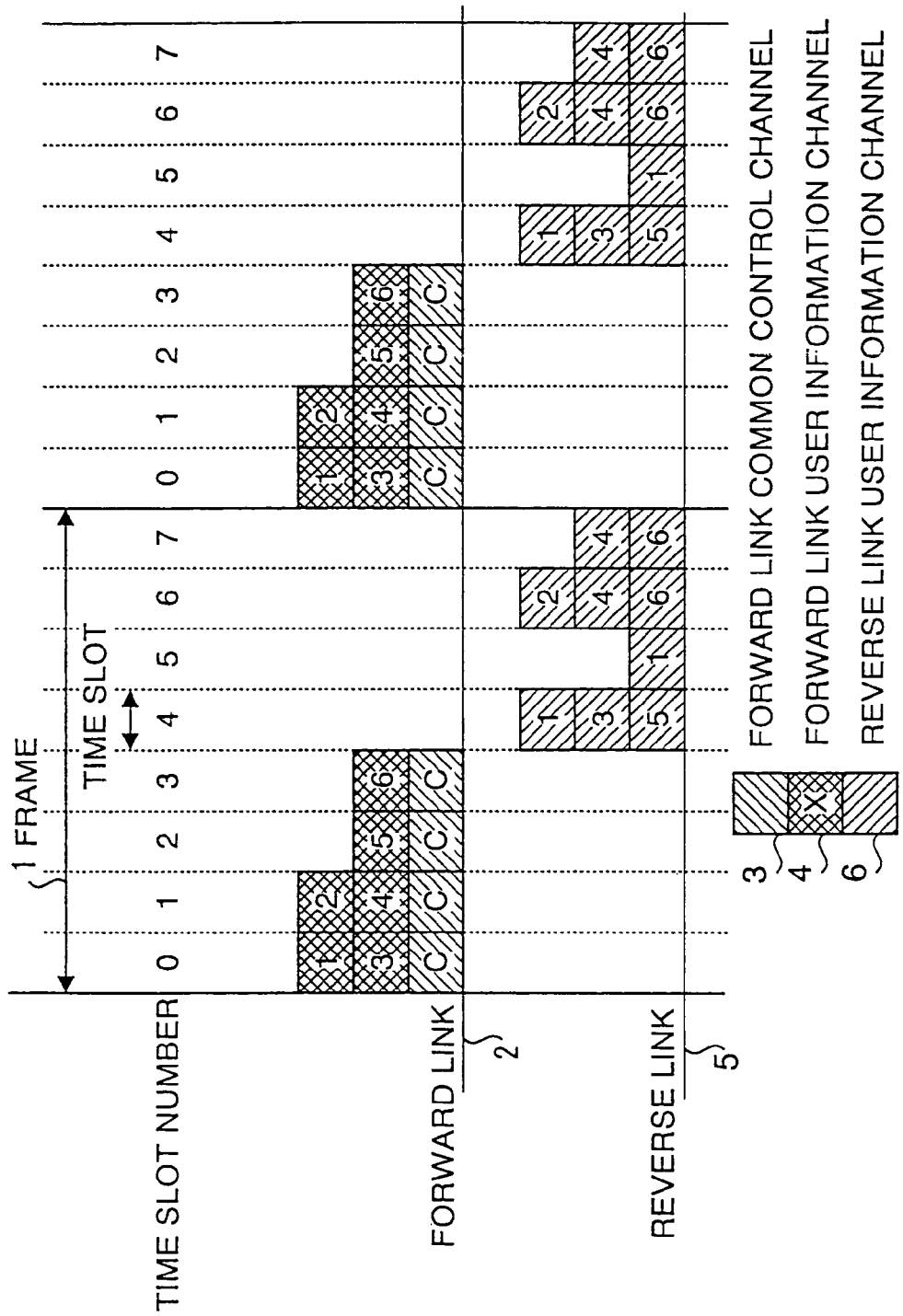
FIG. 1 is a frame diagram applied in a conventional CDMA/TDD mobile communication system.
Figure 2:
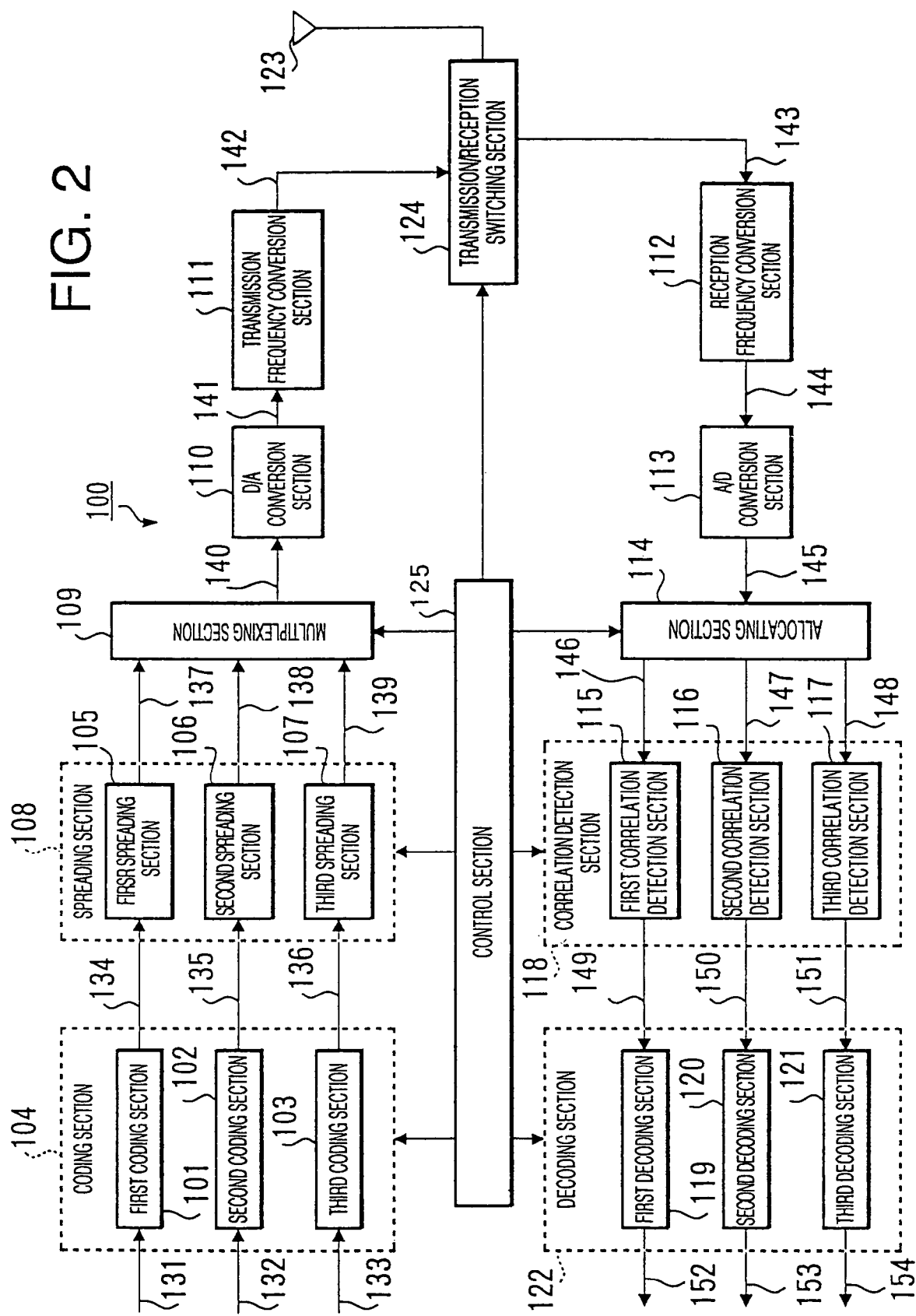
FIG. 2 is block diagram of a base station in a CDMA/TDD mobile communication system according to a first embodiment of the present invention.

FIG. 2 is block diagram of a base station in a CDMA/TDD mobile communication system according to the first embodiment of the present invention.

Base station 100 illustrated in FIG. 2 is composed of coding section 104 having first coding section 101, second coding section 102 and third coding section 103, spreading section 108 having first spreading section 105, second spreading section 106 and third spreading section 107, multiplexing section 109, D/A conversion section 110, transmission frequency conversion section 111, reception frequency conversion section 112, A/D conversion section 113, allocating section 114, correlation detection section 118 having first correlation detection section 115, second correlation detection section 116, and third correlation detection section 117, decoding section 122 having first decoding section 119, second decoding section 120 and third decoding section 121, transmission/reception antenna 123, transmission/reception switching section 124 and control section 125.

Coding sections 101 to 103 execute coding of first to third forward link dedicated control channel signals 131, 132 and 133 respectively. Spreading sections 105 to 107 executed spreading the coded channel signals 134, 135 and 136 respectively.

Multiplexing section 109 multiplexes the spread channel signals 137 to 139. D/A conversion section 110 converts the multiplexed signal 140 into analogue signal 141. Transmission frequency conversion section 111 converts the analogue signal 141 into transmission signal 142 with radio frequency.

Transmission/reception switching section 124 switches transmission/reception antenna 123 for a transmission site and a transmission site to connect. The transmission signal 142 is transmitted from transmission/reception antenna through transmission/reception switching section 124 to a mobile station (not shown).

The reception frequency conversion section 112 converts received signal 431 with radio frequency into signal 144 with baseband frequency. The received signal 431 is received at transmission/reception antenna 123 and transmitted through transmission/reception switching section 124 to the section 112.

A/D conversion section 113 converts the signal 144 with baseband frequency into digital received signal 145. Allocating section 114 allocates digital received signal 145 to channel signals 146, 147 and 148.

Correlation detection sections 115 to 117 detect correlation of reverse link common dedicated channel signals 146 to 148 respectively. Decoding sections 119 to 121 decode correlation detection channel signals 149, 150 and 151 to output channel decoded signals 152, 153 and 154. Control section 125 controls over each section described above.

In a configuration described above, forward link common channel (such as synchronization control channel) signals 131 to 133 are coded and constructed into frames at coding sections 101 to 103 and output to spreading sections 105 to 107 respectively. The coding may be an error correction coding, and in this case, interleaving processing is also executed.

Spreading sections 105 to 107 respectively spread coded channel signals 134 to 136 with a spreading code to output spread signals 137 to 139 to multiplexing section 109. The spreading code may be assigned from control section 125.

Multiplexing section 109 provides spread signals 137 to 139 at time slots to multiplex according to an instruction from control section 125. At this stage, channel signals provided at the same time slot are multiplexed. In the case where the multiplexing processing is executed, a transmission power control may be performed to control an amplitude of each of channel spread signals 137 to 139.

Digital multiplexed signal 140 is converted into analogue signal 141 in D/A conversion section 110. The analogue signal 141 is converted into transmission signal 142 with radio frequency in transmission frequency conversion section 111. The transmission signal 142 is transmitted from transmission/reception antenna 123 through transmission/reception switching section 124.

At this stage, transmission/reception switching section 124 connects transmission/reception antenna 123 to transmission frequency conversion section 111 for a forward link time slot and to reception frequency conversion section 112 for a reverse link time slot according to an instruction from control section 125.

On the other hand, reception signal 143, which is received at transmission/reception antenna 123 from a mobile station, is input to reception frequency conversion section 112 through transmission/reception switching section 124. Reception frequency conversion section 112 converts the received signal 143 with radio frequency into signal 144 with baseband frequency.

A/D conversion section 113 converts the analogue signal 144 with baseband frequency into digital signal 145 to output to allocating section 114. Allocating section 114 divides the digital signal 145 into reverse common control channel signals 146 to 148 according to an instruction of control section 125 to output to correlation detection sections 115 to 117 respectively.

Correlation detection sections 115 to 117 despread the reverse common control channel signals 146 to 148 to detect correlation of a received signal with a spreading code. Each spreading code may be instructed by control section 125.

Detected correlation values (correlation signals) 149 to 151 are respectively output to decoding sections 119 to 121, which decode reverse common control channel signals based on correlation values 149 to 151. At this stage, when a mobile station executes an error correction coding for a reverse link, an error correction decoding with deinterleaving processing is executed.

In addition, each common section may be provided to use for all channels according to time slots instead of using coding sections 101 to 103, spreading sections 105 to 107, correlation detection sections 115 to 117, and decoding sections 119 to 121.

Figure 3:
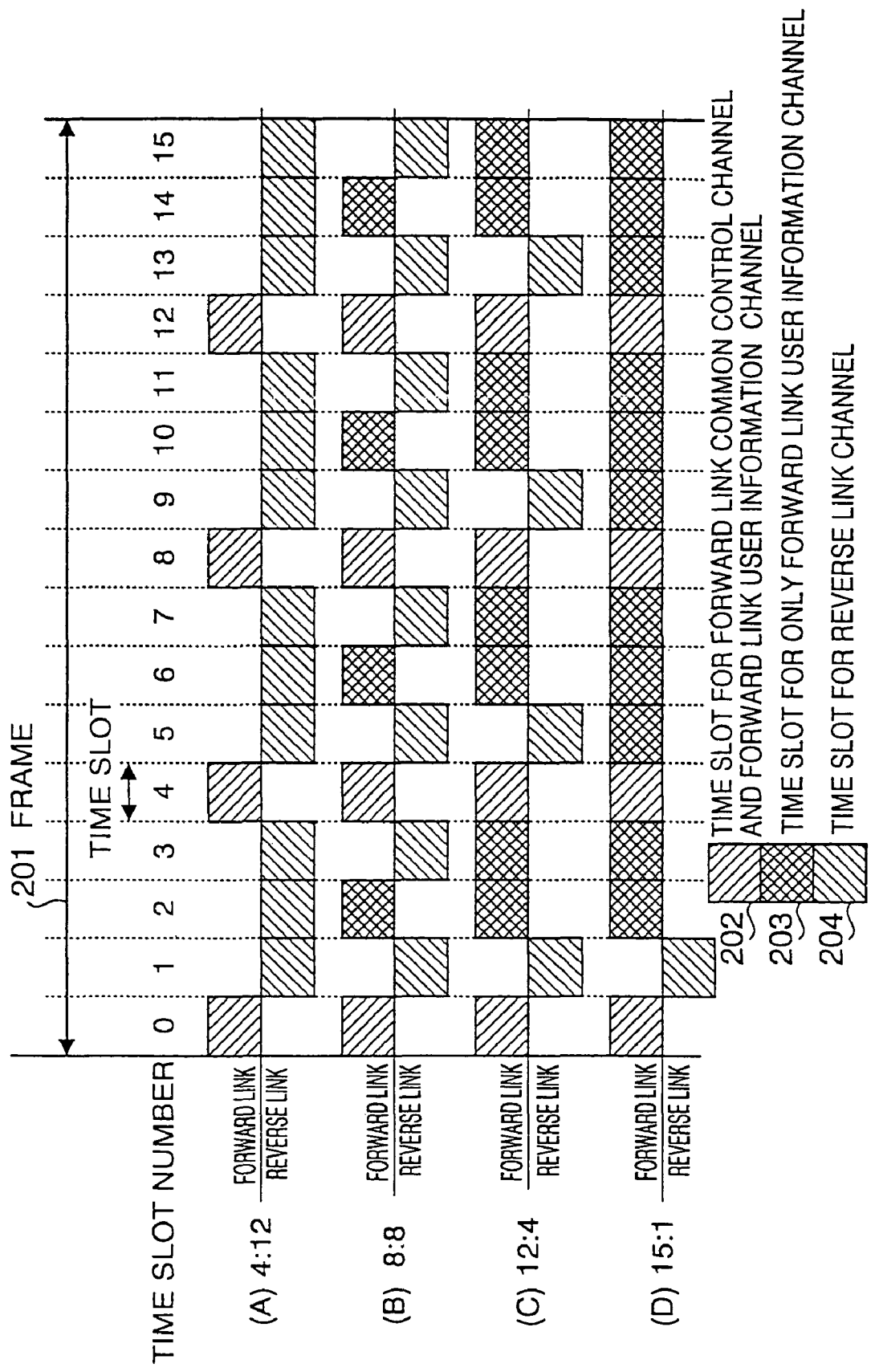
FIG. 3 is a frame diagram illustrating an assignment of time slots at a communication frame applied in the CDMA/TDD mobile communication system according to the first embodiment of the present invention.

An assignment control of time slots is explained from among controls executed by control section 125 with reference to FIG. 3. FIG. 3 is a frame diagram illustrating an assignment of time slots at a communication frame in a CDMA/TDD mobile communication system. The assignment illustrates an example where one frame 201 is divided into 16 time slots 0 to 15.

In FIG. 3, 202 indicates a time slot at which a forward link common control channel signal and a forward link user information channel signal are provided, 203 indicates a time slot at which only a forward link user information channel signal is provided, and 204 indicates a time slot at which a reverse link channel signal is provided.

Control section 125 first compares an information volume of the forward link with that of reverse link and determines the numbers of time slots to be assigned to the forward link and the reverse link. At this point, the number of time slots necessary to transmit a forward link common control channel signal including a synchronization control channel signal is primarily assigned to the forward link. The other time slots are assigned to the forward link and reverse link taking the information volumes into consideration.

Then, the forward link common control channel signal including the synchronization control channel signal is provided at a time slot at a predetermined time slots interval at a frame, accordingly the time slot is assigned for a forward link time slot.

Further, the rest of forward link time slots are provided at the frame. At this point, the forward link time slots are provided primarily at time slots except for those following just after the forward link time slots to transmit control channel signals including synchronization control channel signals. Then the other time slots are assigned for the reverse link time slots.

In the forward link time slots at which forward link common control channel signals including synchronization control channel signals are provided, the forward link common control channel signals may be not only provided, but also other forward link channel signals may be provided. In this case, a plurality of channel signals provided in the time slot are multiplexed to transmit.

FIG. 3 illustrates examples of assigning sixteen time slots at a frame.

(A) in FIG. 3 illustrates the case where four time slots 0, 4, 8 and 12 are assigned for forward link time slots, and the other twelve time slots are assigned for reverse link time slots.

(B) in FIG. 3 illustrates the case where eight time slots are assigned for forward link time slots, and the other eight time slots are assigned for reverse link time slots. The times slots 0, 4, 8 and 12 are assigned for forward link time slots to transmit forward link common control channel signals including synchronization control channel signals and the time slots 2, 6, 10 and 14 are further assigned for forward link time slots. The time slots 1, 3, 5, 7, 9, 11, 13 and 15 are assigned for reverse link time slots.

(C) in FIG. 3 illustrates the case where twelve time slots are assigned for forward link time slots, and the other four time slots are assigned for reverse link time slots. The time slots 0, 4, 8 and 12 are assigned for forward link time slots to transmit forward link common control channel signals including synchronization control channel signals and the time slots 2, 3, 6, 7, 10, 11, 14 and 15 are further assigned for forward link time slots. The time slots 1, 5, 9, and 13 are assigned for reverse link time slots.

(D) in FIG. 3 illustrates the case where fifteen time slots are assigned for forward link time slots, and the other one time slot is assigned for a reverse link time slot. The time slots 0, 4, 8 and 12 are assigned for the forward link time slots to transmit forward link common control channel signals including synchronization control channel signals and the time slots 2, 3, 5, 6, 7, 9, 10, 11, 13, 14 and 15 are further assigned for forward link time slots. The time slot 1 is assigned for the reverse link time slot.

In (c) and (D) in FIG. 3, the reverse link time slots are positioned just after the time slots assigned for forward link time slots to transmit common control channel signals including synchronization control channel signals. As a result, in the case where a closed-loop control is performed in the system, it is possible for a mobile station to control transmission power using a TPC bit contained in the control channel signal in the received forward link common control channel signal. Accordingly, the mobile station can respond rapidly to a propagation environment such as fading.

The assignment of time slots may be changed manually corresponding to a change of an information volume, or changed automatically according to the change of the information volume caused by a new connection or a break, or at predetermined intervals.

A mobile station acquires synchronization with a base station when it is turned on by first despreading a received signal with a spreading code used in the synchronization control channel signal to detect the synchronization control channel signal.

Under such condition, the mobile station does not know an assignment of time slots for a forward link and a reverse link when it is turned on, however knows in advance that a synchronization control channel signal is positioned once every four slots with three time slots inserted. Therefore, the mobile station can detect a timing of the synchronization control channel signal by integrating correlation values over every four time slots interval.

The mobile station decodes the common control channel signal including the synchronization control channel signal using the detected timing in order to recognize positions of forward link time slots and reverse link time slots and time slots assigned to each channel.

Then the mobile station performs connection processing using the recognized common control channel and dedicated control channel to establish a user information channel. Signals of user information channel between a mobile station and a base station are provided differently for a forward link and a reverse link at a frame 201. Therefore, the time difference between a forward link user information channel time slot and a reverse link user information channel time slot is sometimes large with the other many time slots inserted between those time slots.

In the case of performing a reverse link transmission power control using an open-loop control, since the correlation characteristic of propagation path conditions of a forward link and a reverse link is used, the large time difference introduces the low correlation characteristic, resulting in a reduced accuracy of the transmission power control.

However, since the forward link common control channel signal is transmitted every four time slots, when a reception quality is measured using the forward link common control channel signal and the transmission power control is performed based on the measured reception quality, the time difference between the forward link time slot used to measure the reception quality and the reverse link time slot to be transmitted under the transmission power control are a two time slots time at maximum, thereby enabling an efficient transmission power control.

In addition, It is preferable to use the arbitrary number of time slots composing a frame other than sixteen. It is also preferable to provide a forward link common control channel signal every arbitrary number of time slots other than every four time slots. It is further preferable to provide a forward link common control channel signal at a predetermined periodical pattern other than at equal intervals.

As described above, according to the first embodiment, under the control of control section 125 in base station 100, some of time slots at a communication frame are assigned primarily to fixed forward link time slots at predetermined intervals and the other time slots are allocated to forward link time slots and reverse link time slots corresponding to a ratio of the total information volume of the reverse link to that of the forward link in a system, in order to transmit a control channel signal including a synchronization control channel signal using the fixed forward link time slot and transmit traffic channel signals of forward link and reverse link respectively using the forward link time slots and the reverse link time slots that are allocated according to the number of time slots respectively required corresponding to the respective information volume. The above processing makes it possible to shorten a time for a mobile station to acquire synchronization with a base station even when an assignment of time slots for forward and reverse links is changed corresponding to the information volumes of forward link and reverse link in the case where the information volumes are asymmetry, thereby enabling an open-loop controlled transmission power control to function effectively.

Second Embodiment

Figure 4:
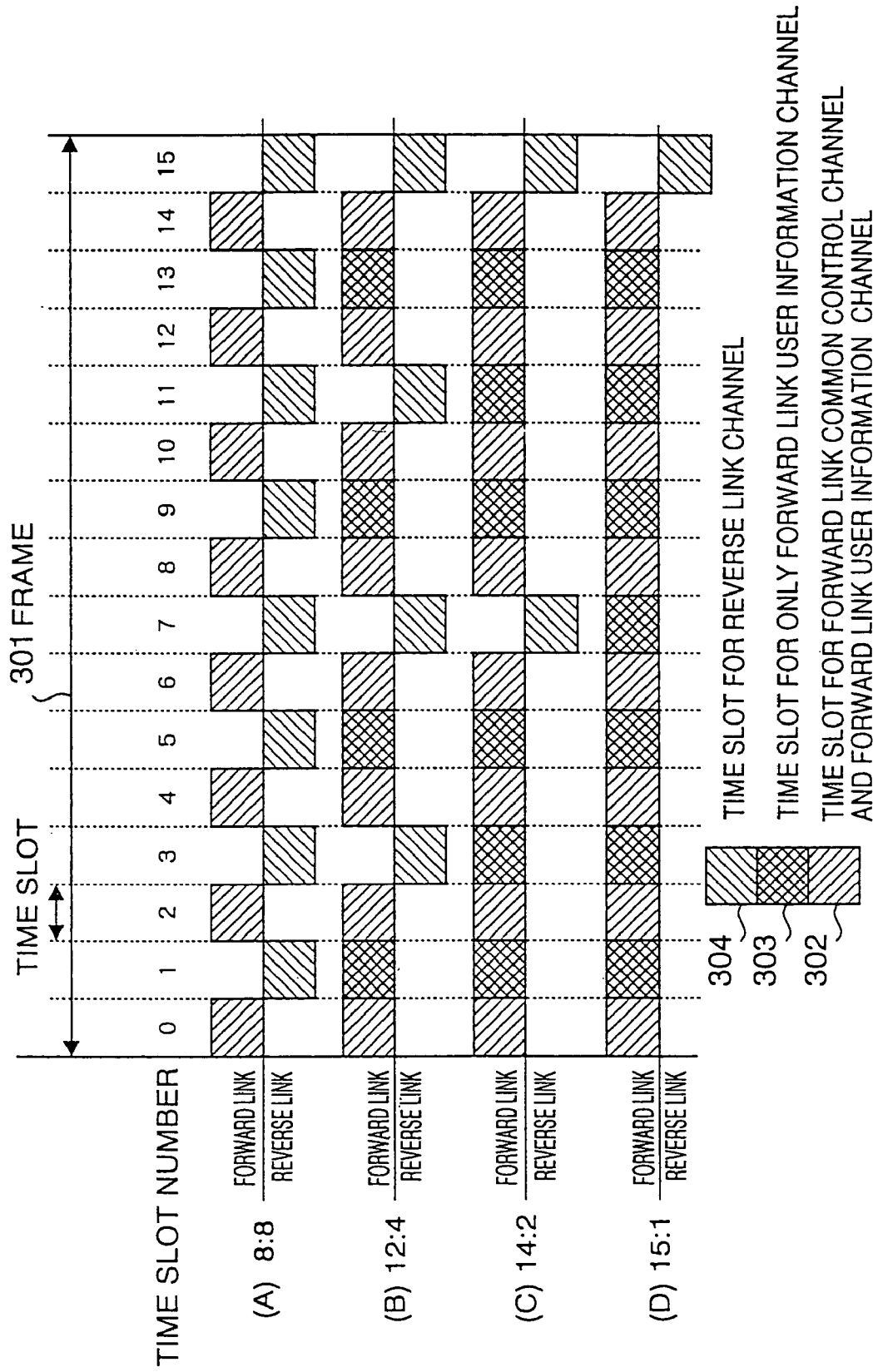
FIG. 4 is a frame diagram illustrating an assignment of time slots at a communication frame applied in a CDMA/TDD mobile communication system according to a second embodiment of the present invention.

FIG. 4 is a frame diagram illustrating an assignment of time slots at a communication frame applied in a CDMA/TDD mobile communication system according to the second embodiment of the present invention.

FIG. 4 illustrates an example where one frame 301 is divided into sixteen time slots 0 to 15. In FIG. 4, the reference number 302 indicates a time slot at which a forward link common control channel signal and a forward link user information channel signal are provided, the reference number 303 indicate a time slot at which only a forward link user information channel signal is provided, and the reference number 304 indicate a time slot at which a reverse link channel signal is provided.

Control section 125 of base station 100 illustrated in FIG. 2 first compares an information volume of the forward link with that of reverse link and determines the numbers of time slots to be assigned to the forward link and the reverse link.

At this point, the number of time slots necessary to transmit a forward link common control channel signal including a synchronization control channel signal is primarily assigned to the forward link. The other time slots are assigned to the forward link and reverse link taking the information volumes into consideration.

Then, the forward link common control channel signal including the synchronization control channel signal is provided at a slot every two slots with a slot inserted, accordingly the time slot is assigned for a forward link time slot. Further, the other forward link time slots are provided at the frame, and the rest of the time slots are assigned for reverse link time slots.

In the forward link time slots at which forward link common control channel signals including synchronization control channel signals are provided, the forward link common control channel signals including synchronization control channel signals may be not only provided, but also other forward link channel signals may be provided. In this case, a plurality of channel signals provided in the same time slot are multiplexed to transmit.

(A) in FIG. 4 illustrates the case where eight time slots are assigned for forward link time slots, and the other eight time slots are assigned for reverse link time slots. The time slots 0, 2, 4, 6, 8, 10, 12 and 14 are assigned for forward link time slots to transmit forward link common control channel signals including synchronization control channel signals, and the time slots 1, 3, 5, 7, 9, 11, 13 and 15 are assigned for reverse link time slots.

(B) in FIG. 4 illustrates the case where twelve time slots are assigned for forward link time slots, and the other eight time slots are assigned for reverse link time slots. The time slots 0, 2, 4, 6, 8, 10, 12 and 14 are assigned for forward link time slots to transmit forward link common control channel signals including synchronization control channel signals and the time slots 1, 5, 9 and 13 are further assigned for forward link time slots. The time slots 3, 7, 11, and 15 are assigned for reverse link time slots.

(C) in FIG. 4 illustrates the case where fourteen time slots are assigned for forward link time slots, and the other two time slots are assigned for reverse link time slots. The time slots 0, 2, 4, 6, 8, 10, 12 and 14 are assigned for forward link time slots to transmit forward link common control channel signals including synchronization control channel signals and the time slots 1, 3, 5, 9, 11 and 13 are further assigned for forward link time slots. The time slots 7 and 15 are assigned for reverse link time slots.

(D) in FIG. 3 illustrates the case where fifteen time slots are assigned for forward link time slots, and the other one slot is assigned for a reverse link time slot. The time slots 0, 2, 4, 6, 8, 10, 12 and 14 are assigned for forward link time slots to transmit forward link common control channel signals including synchronization control channel signals and the time slots 1, 3, 5, 7, 9, 11 and 13 are further assigned for forward link time slots. The time slot 15 is assigned for a reverse link time slot.

As describe above, in FIG. 4, time slots provided just after time slots to transmit forward link common control channel signals including synchronization control channel signals are always reverse link time slots.

In other words, by providing one of time slots to transmit forward link common control channel signals including synchronization control channel signals every two time slots, i.e., with one other time slot inserted between those, even when reverse time slots are provided in any time slots, it is configured that the time slots just before the reverse link time slots are always the forward link time slots to transmit common control channel signals including synchronization control channel signals.

Therefore, in the case where a closed-loop control is performed in the system, it is possible for a mobile station to control transmission power using a TPC bit contained in the control channel signal in the received forward link common control channel signal. Accordingly, the mobile station can respond rapidly to a propagation environment such as fading.

The assignment of time slots may be changed manually corresponding to a change of an information volume, or changed automatically according to the change of the information volume caused by a new connection or a break, or at predetermined intervals.

Under such condition, a mobile station (not shown) acquires synchronization with a base station when it is turned on by first despreading a received signal with a spreading code used in the synchronization control channel signal to detect the synchronization control channel signal.

The mobile station does not know an assignment of time slots for a forward link and a reverse link when it is turned on, however the mobile station can detect a timing of the synchronization control channel signal by integrating correlation values over every two time slots interval.

Then, the mobile station decodes the common control channel signal including the synchronization control channel signal using the detected timing in order to recognize positions of forward link time slots and reverse link time slots and time slots assigned to each channel, and performs connection processing using the recognized common control channel and dedicated control channel to establish a user information channel.

User information channel slots between a mobile station and a base station are positioned differently for forward link and reverse link at a frame. Therefore, the time difference between a forward link user information channel time slot and a reverse link user information channel time slot is sometimes large with the other many time slots inserted between those time slots.

In the case of performing a reverse link transmission power control using an open-loop control, the large time difference introduces the low correlation characteristic of propagation path conditions of the forward link and reverse link, resulting in a reduced accuracy of the transmission power control. However, since the common control channel is transmitted once every two slots, when the transmission power control is performed based on the reception quality obtained by using the received common control channel, it is possible to use the reception quality of the forward link time slot just before the reverse link time slot to be transmitted under the transmission power control, thereby enabling an effective transmission power control. In addition, it is also preferable to use the arbitrary number of time slots composing a frame other than sixteen.

As described above, according to the second embodiment, a time slot in every two slots is assigned for a fixed forward link time slot and the other time slots are allocated for forward link time slots and reverse link time slots corresponding to a ratio of the total information volume of forward link to that of the reverse link in a system, in order to transmit a control channel signal including a synchronization control channel signal using the fixed forward link time slot and transmit traffic channel signals of forward link and reverse link respectively using the forward link time slots and the reverse link time slots that are allocated according to the number of time slots respectively required corresponding to the respective information volume. The above processing makes it possible to shorten a time for a mobile station to acquire synchronization with a base station even when an assignment of time slots for forward and reverse links is changed corresponding to the information volumes of forward link and reverse link when the information volumes are asymmetry, thereby enabling an open-loop controlled transmission power control to function effectively.

Third Embodiment

Figure 5:
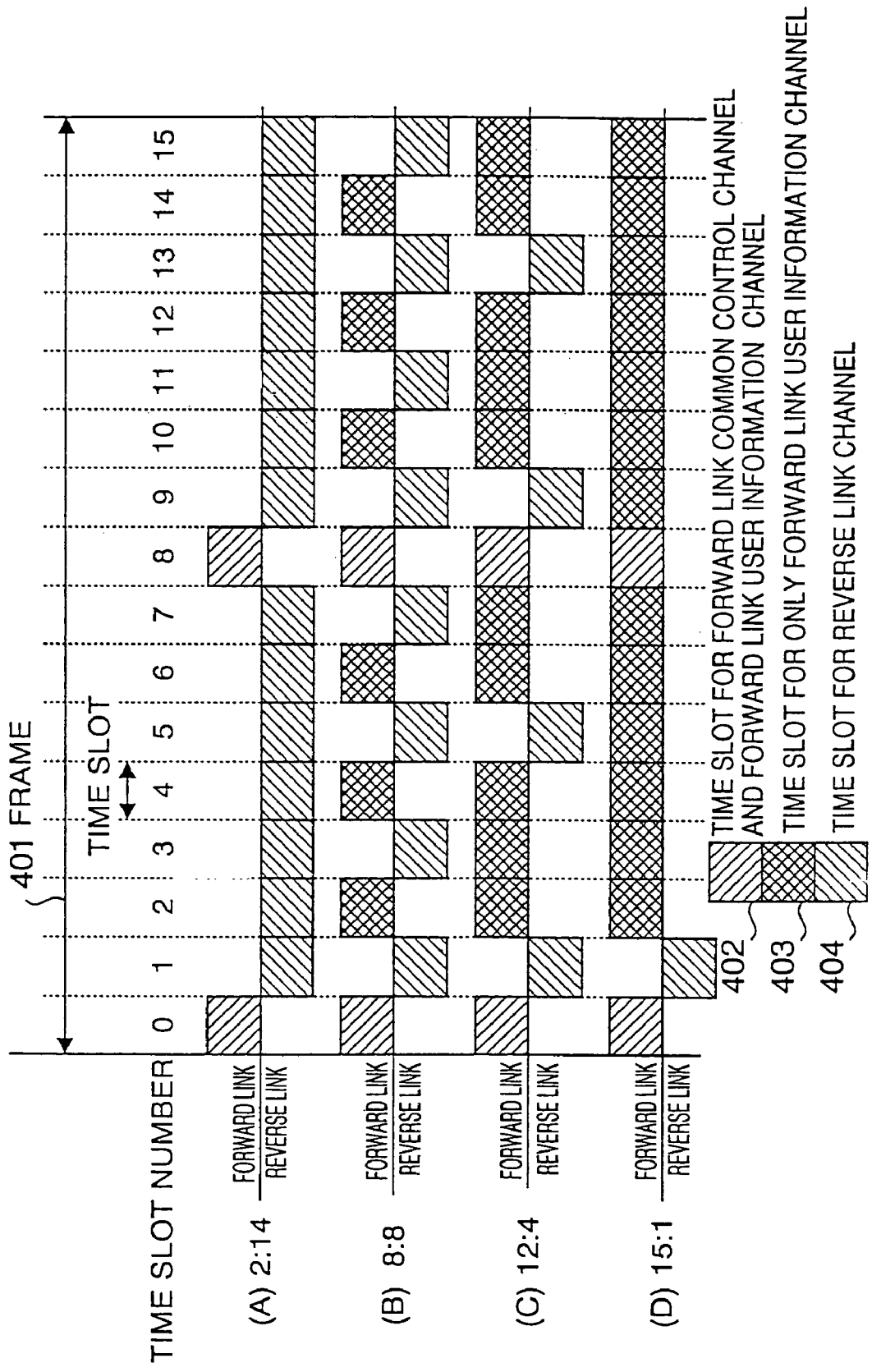
FIG. 5 is a frame diagram illustrating an assignment of time slots at a communication frame applied in a CDMA/TDD mobile communication system according to a third embodiment of the present invention.

FIG. 5 is a frame diagram illustrating an assignment of time slots at a communication frame applied in a CDMA/TDD mobile communication system according to the third embodiment of the present invention.

FIG. 5 illustrates an example where one frame 401 is divided into sixteen time slots 0 to 15. In FIG. 5, the reference number 402 indicates a time slot at which a forward link common control channel signal and a forward link user information channel signal are provided, the reference number 403 indicates a time slot at which a forward link user information channel signal is provided, and the reference number 404 indicates a time slot at which a reverse link channel signal is provided.

Control section 125 of base station 100 illustrated in FIG. 2 first compares an information volume of the forward link with that of reverse link and determines the numbers of time slots to be assigned to the forward link and the reverse link.

At this point, the number of time slots necessary to transmit a forward link common control channel signal including a synchronization control channel signal is primarily assigned to the forward link. The other time slots are assigned to the forward link and reverse link taking the information volumes into consideration.

Then, the forward link common control channel signal including the synchronization control channel signal is provided at a slot every eight time slots with seven time slots inserted, accordingly the time slot is assigned for a forward link time slot. Further, the other forward link time slots are provided at the frame, and the rest of time slots are assigned for reverse link time slots.

In the forward link time slots at which forward link common control channel signals including synchronization control channel signals are provided, the forward link common control channel signals including synchronization control channel signals may be not only provided, but also other forward link channel signals may be provided. In this case, a plurality of channel signals provided in the same time slot are multiplexed to transmit.

(A) in FIG. 5 illustrates the case where two time slots are assigned for forward link time slots, and the other fourteen time slots are assigned for reverse link time slots. The time slots 0 and 8 are assigned for forward link time slots to transmit forward link common control channel signals including synchronization control channel signals. The other time slots 1 to 7 and 9 to 15 are assigned for reverse link time slots.

(B) in FIG. 5 illustrates the case where eight time slots are assigned for forward link time slots, and the other eight time slots are assigned for reverse link time slots. The time slots 0 and 8 are assigned for forward link time slots to transmit forward link common control channel signals including synchronization control channel signals and the time slots 2, 4, 6, 10, 12 and 14 are further assigned for forward link time slots. The time slots 1, 3, 5, 7, 9, 11, 13 and 15 are assigned for reverse link time slots.

(C) in FIG. 5 illustrates the case where twelve time slots are assigned for forward link time slots, and the other four time slots are assigned for reverse link time slots. The time slots 0 and 8 are assigned for forward link time slots to transmit forward link common control channel signals including synchronization control channel signals and the time slots 2, 3, 4, 6, 7, 10, 11, 12, 14 and 15 are further assigned for forward link time slots. The time slots 1, 5, 9 and 13 are assigned for reverse link time slots.

(D) in FIG. 5 illustrates the case where fifteen time slots are assigned for forward link time slots, and the other one time slot is assigned for a reverse link time slot. The time slots 0 and 8 are assigned for forward link time slots to transmit forward common control channel signals including synchronization control channel signals and the time slots 2 to 7 and 9 to 15 are further assigned for forward link time slots. The other time slot 15 is assigned for a reverse link time slot.

As describe above, in FIG. 5, time slots provided just after time slots to transmit forward link common control channel signals including synchronization control channel signals are always reverse link time slots.

In other words, by providing one of time slots to transmit forward link common control channel signals including synchronization control channel signals every eight time slots, i.e., with seven other time slots inserted between those, even though reverse time slots are provided at any time slots, it is configured that the time slot just before at least one of the reverse link time slots at a frame is always a forward link-time slot to transmit common control channel signals including synchronization control channel signals.

Therefore, in the case where a closed-loop control is performed in the system, it is possible for a mobile station to control transmission power using a TPC bit contained in the control channel signal in the received forward link common control channel signal. Accordingly, the mobile station can respond rapidly to a propagation environment such as fading.

The assignment of time slots may be changed manually corresponding to a change of an information volume, or changed automatically according to the change of the information volume caused by a new connection or a break, or at predetermined intervals.

Under such condition, a mobile station (not shown) acquires synchronization with a base station when it is turned on by first despreading a received signal with a spreading code used in the synchronization control channel signal to detect the synchronization control channel signal.

The mobile station does not know an assignment of time slots for a forward link and a reverse link when it is turned on, however the mobile station can detect a timing of the synchronization control channel signal by integrating correlation values over every eight time slots intervals.

Then, the mobile station decodes the common control channel signal including the synchronization control channel signal using the detected timing in order to recognize positions of forward link time slots and reverse link time slots and time slots assigned to each channel, and performs connection processing using the recognized common control channel and dedicated control channel to establish a user information channel.

User information channel slots between a mobile station and a base station are positioned differently for forward link and reverse link at a frame. Therefore, the time difference between a forward link user information channel time slot and a reverse link user information channel time slot is sometimes large with the other many time slots inserted between those time slots.

In the case of performing a reverse link transmission power control using an open-loop control, the large time difference introduces the low correlation characteristic of propagation path conditions of the forward link and reverse link, resulting in a reduced accuracy of the transmission power control. However, since the common control channel is transmitted once every eight slots, when the transmission power control is performed based on the reception quality obtained by using the received common control channel, it is possible to use the reception quality of the forward link time slot just before the reverse link time slot to be transmitted under the transmission power control, thereby enabling an effective transmission power control. In addition, it is also preferable to use the arbitrary number of time slots composing a frame other than sixteen.

As described above, according to the third embodiment, a time slot in every eight slots is assigned for a fixed forward link time slot and the other time slots are allocated for forward link time slots and reverse link time slots corresponding to a ratio of the total information volume of reverse link to that of the forward link in a system, in order to transmit a control channel signal including a synchronization control channel signal using the fixed forward link time slot and transmit traffic channel signals of forward link and reverse link respectively using the forward link time slots and the reverse link time slots that are allocated according to the number of time slots respectively required corresponding to the respective information volume. The above processing makes it possible to shorten a time for a mobile station to acquire synchronization with a base station even when an assignment of time slots for forward and reverse links is changed corresponding to the information volumes of forward link and reverse link in the case where the information volumes are asymmetry, thereby enabling an open-loop controlled transmission power control to function effectively. In this case, it is possible to obtain many variations of allocation configuration of the number of forward link time slots and the number of reverse link time slots.

Fourth Embodiment

Figure 6:
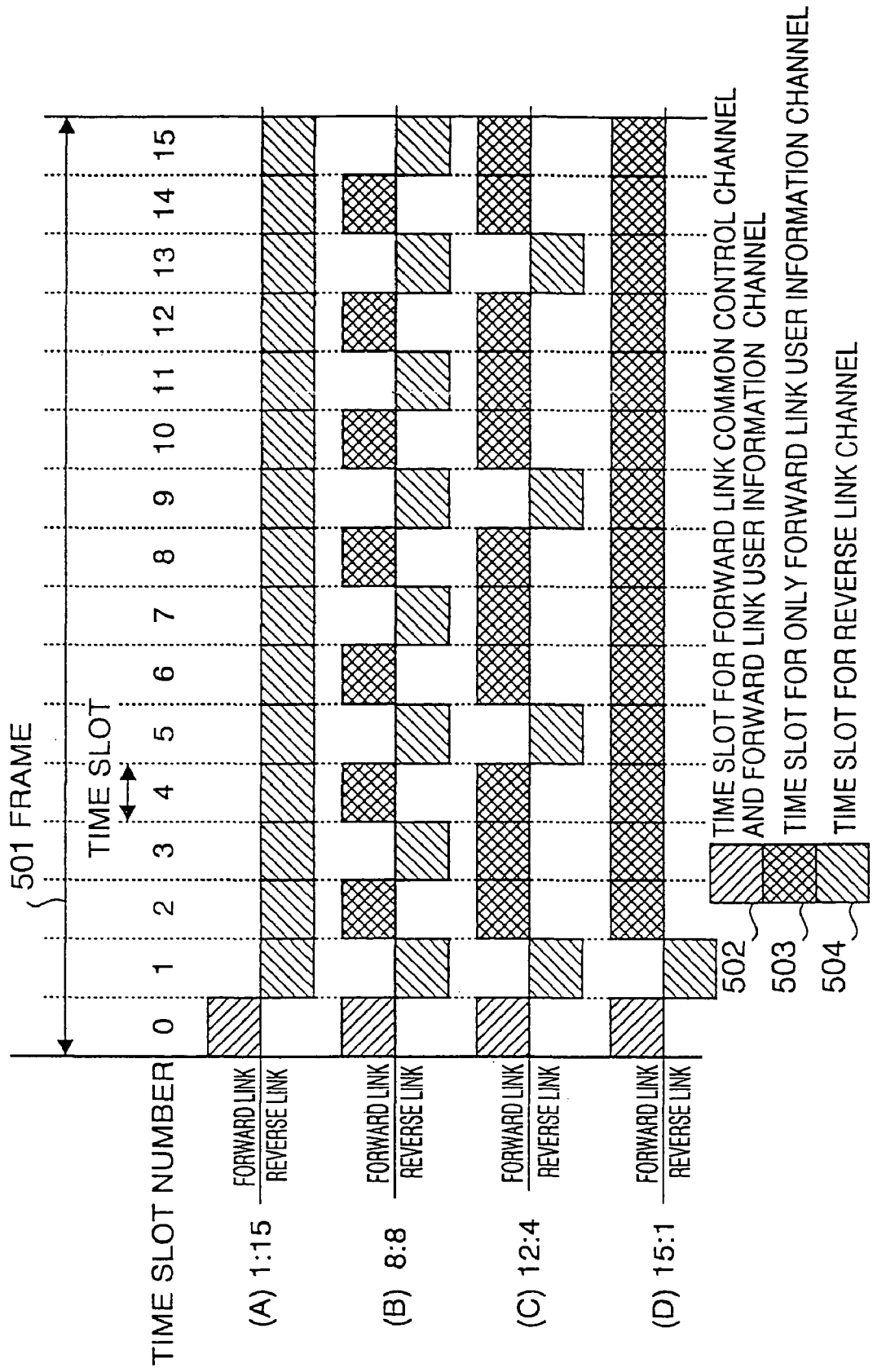
FIG. 6 is a frame diagram illustrating an assignment of time slots at a communication frame applied in a CDMA/TDD mobile communication system according to a fourth embodiment of the present invention.

FIG. 6 is a frame diagram illustrating an assignment of time slots at a communication frame applied in a CDMA/TDD mobile communication system according to the fourth embodiment of the present invention.

FIG. 6 illustrates an example where one frame 501 is divided into sixteen time slots 0 to 15. In FIG. 6, the reference number 502 indicates a time slot at which a forward link common control channel signal and a forward link user information channel signal are provided, the reference number 503 indicates a time slot at which a forward link user information channel signal is provided, and the reference number 504 indicates a time slot at which a reverse link channel signal is provided.

Control section 125 of base station 100 illustrated in FIG. 2 first compares an information volume of the forward link with that of reverse link and determines the numbers of time slots to be assigned to the forward link and the reverse link.

At this point, the number of time slots necessary to transmit a forward link common control channel signal including a synchronization control channel signal is primarily assigned to the forward link. The other time slots are assigned to the forward link and reverse link taking the information volumes into consideration.

Then, the forward link common control channel signal including the synchronization control channel signal is provided at a slot in every sixteen slots, accordingly the time slot is assigned for a forward link time slot. Further, the other forward link time slots are provided at the frame, and the rest of time slots are assigned for reverse link time slots.

In the forward link time slots at which forward link common control channel signals including synchronization control channel signals are provided, the forward link common control channel signals including synchronization control channel signals may be not only provided, but also other forward link channel signals may be provided. In this case, a plurality of channel signals provided in the time slot are multiplexed to transmit.

(A) in FIG. 6 illustrates the case where one time slot is assigned for a forward link time slot, and the other fifteen time slots are assigned for reverse link time slots. The time slot 0 is assigned for a forward link time slot to transmit forward link common control channel signals including synchronization control channel signals. The other time slots 1 to 15 are assigned for reverse link time slots.

(B) in FIG. 4 illustrates the case where eight time slots are assigned for forward link time slots, and the other eight time slots are assigned for reverse link time slots. The time slot 0 is assigned for a forward link time slot to transmit forward link common control channel signals including synchronization control channel signals and the time slots 2, 4, 6, 8, 10, 12 and 14 are further assigned for forward link time slots. The time slots 1, 3, 5, 7, 9, 11, 13 and 15 are assigned for reverse link time slots.

(C) in FIG. 6 illustrates the case where twelve time slots are assigned for forward link time slots, and the other four time slots are assigned for reverse link time slots. The time slot 0 is assigned for a forward link time slot to transmit common control channel signals including synchronization control channel signals and the time slots 2, 3, 4, 6, 7, 8, 10, 11, 12, 14 and 15 are further assigned for forward link time slots. The time slots 1, 5, 9 and 13 are assigned for reverse link time slots.

(D) in FIG. 3 illustrates the case where fifteen time slots are assigned for forward link time slots, and the other one time slot is assigned for reverse link time slots. The time slot 0 is assigned for a forward link time slot to transmit common control channel signals including synchronization control channel signals and the time slots 2 to 15 are further assigned for forward link time slots. The time slot 1 is assigned for a reverse link time slot.

As describe above, in FIG. 6, time slots provided just after time slots to transmit forward link common control channel signals including synchronization control channel signals are always reverse link time slots.

In other words, by providing one of time slots to transmit forward link common control channel signals including synchronization control channel signals every sixteen time slots, i.e., with fifteen other time slots inserted between those, even though reverse time slots are provided in any time slots, it is configured that the time slot just before at least one of the reverse link time slots at a frame is always a forward link time slot to transmit common control channel signals including synchronization control channel signals.

Therefore, in the case where a closed-loop control is performed in the system, it is possible for a mobile station to control transmission power using a TPC bit contained in the control channel signal in the received forward link common control channel signal. Accordingly, the mobile station can respond rapidly to a propagation environment such as fading.

The assignment of time slots may be changed manually corresponding to a change of an information volume, or changed automatically according to the change of the information volume caused by a new connection or a break, or at predetermined intervals.

Under such condition, a mobile station (not shown) acquires synchronization with a base station when it is turned on by first despreading a received signal with a spreading code used in the synchronization control channel signal to detect the synchronization control channel signal.

The mobile station does not know an assignment of time slots for a forward link and a reverse link when it is turned on, however the mobile station can detect a timing of the synchronization control channel signal by integrating correlation values over every fifteen time slots intervals.

Then, the mobile station decodes the common control channel signal including the synchronization control channel signal using the detected timing in order to recognize positions of forward link time slots and reverse link time slots and time slots assigned to each channel, and performs connection processing using the recognized common control channel and dedicated control channel to establish a user information channel.

User information channel slots between a mobile station and a base station are positioned differently for forward link and reverse link at a frame. Therefore, the time difference between a forward link user information channel time slot and a reverse link user information channel time slot is sometimes large with the other many time slots inserted between those time slots.

In the case of performing a reverse link transmission power control using an open-loop control, the large time difference introduces the low correlation characteristic of propagation path conditions of the forward link and reverse link, resulting in a reduced accuracy of the transmission power control. However, since the common control channel is transmitted once every sixteen slots, when the transmission power control is performed based on the reception quality obtained by using the received common control channel, it is possible to use the reception quality of the forward link time slot just before the reverse link time slot to be transmitted under the transmission power control, thereby enabling an effective transmission power control. In addition, it is also preferable to use the arbitrary number of time slots composing a frame other than sixteen.

As described above, according to the fifth embodiment, a time slot in every sixteen slots is assigned for a fixed forward link time slot and the other time slots are allocated for forward link time slots and reverse link time slots corresponding to a ratio of the total information volume of reverse link to that of the forward link in a system, in order to transmit a control channel signal including a synchronization control channel signal using the fixed forward link time slot and transmit traffic channel signals of forward link and reverse link respectively using the forward link time slots and the reverse link time slots that are allocated according to the number of time slots respectively required corresponding to the respective information volume. The above processing makes it possible to shorten a time for a mobile station to acquire synchronization with a base station even when an assignment of time slots for forward and reverse links is changed corresponding to the information volumes of forward link and reverse link in the case where the information volumes are asymmetry, thereby enabling an open-loop controlled transmission power control to function effectively. In this case, it is possible to obtain many variations of allocation configuration of the number of forward link time slots and the number of reverse link time slots.

Fifth Embodiment

Figure 7:
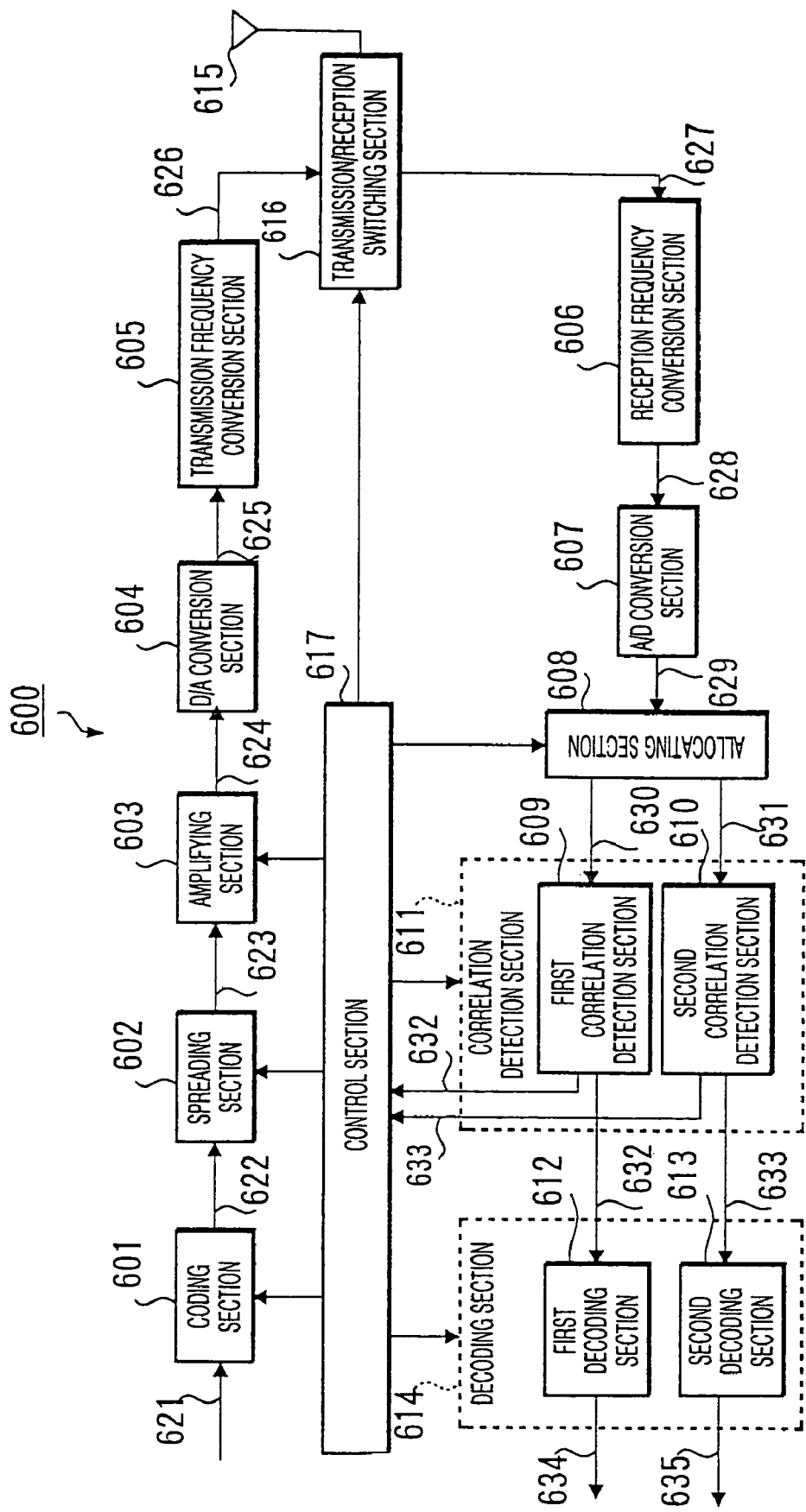
FIG. 7 is a block diagram of a mobile station in a CDMA/TDD mobile communication system according to a fifth embodiment of the present invention.

FIG. 7 is block diagram of a mobile station as an example of communication terminal devices in a CDMA/TDD mobile communication system according to the fifth embodiment of the present invention.

Mobile station 600 illustrated in FIG. 7 is composed of coding section 601, spreading section 602, amplifying section 603, D/A conversion section 640, transmission frequency conversion section 605, reception frequency conversion section 606, A/D conversion section 607, allocating section 608, correlation detection section 611 including first correlation detection section 609, and second correlation detection section 610, decoding section 614 including first decoding section 612 and second decoding section 613, transmission/reception antenna 615, transmission/reception switching section 616 and control section 617.

Coding section 601 codes reverse link channel signal 621. Spreading section 602 spreads coded signal 622. Amplifying section 603 amplifies spread signal 623.

D/A conversion section 604 converts digital amplified signal 624 into analogue signal 625. Transmission frequency conversion section 605 converts the analogue signal 625 into transmission signal 626 with radio frequency.

Transmission/reception switching section 616 switches transmission/reception antenna 615 for a transmission site and a transmission site to connect. The transmission signal 626 is transmitted from transmission/reception antenna 615 through transmission/reception switching section 616 to a base station illustrated in FIG. 2 by radio communication.

Reception frequency conversion section 606 converts received signal 627 with radio frequency into signal 628 with baseband frequency. The received signal 627 is received at transmission/reception antenna 615 and transmitted through transmission/reception switching section 616 to the section 606.

A/D conversion section 607 converts the signal 628 with baseband frequency into digital received signal 629. Allocating section 608 allocates the digital received signal 629 to channel signals 630 and 631.

Correlation detection sections 609 and 610 detect respectively forward link common dedicated channel signals 630 and 631. Decoding sections 612 and 613 decode channel correlation detection signals 632 and 633 to output channel decoded signals 634 and 635 respectively. Control section 617 controls over each section described above.

In a configuration described above, reverse link channel signal 612 is coded and constructed into frames at coding section 602 and output to spreading section 602. The coding may be an error correction coding, and in this case, interleaving processing is also executed.

Spreading section 602 spreads coded signal 622 with a spreading code and outputs spread signal 623 to amplifying section 603. The spreading code may be assigned from control section 617.

Amplifying section 603 provides the spread signal 623 at a time slot assigned according to an instruction from control section 617 and performs transmission power control by amplifying or decreasing an amplitude of the spread signal 623 according to an instruction from control section 617 to output to D/A conversion section 604.

D/A conversion section 604 converts digital amplified 624 into analogue signal 625 to output to transmission frequency conversion section 605. Transmission frequency conversion section 605 converts the analogue signal 625 into transmission signal 626 with radio frequency to output to transmission/reception switching section 616.

Transmission/reception switching section 616 connects transmission/reception antenna 615 to transmission frequency conversion section 605 for a reverse link time slot and to reception frequency conversion section 606 for a forward link time slot according to an instruction from control section 617.

In other words, with respect to reverse link time slots, transmission signal 626, which is subjected to the conversion of frequency into the radio frequency at reception frequency conversion section 605, is transmitted from transmission/reception antenna 123 to a base station 100.

On the other hand, with respect to forward link time slots, received signal 627 that is received at transmission/reception antenna 123 is input to reception frequency conversion section 606.

Reception frequency conversion section 606 converts the received signal 627 with radio frequency into received signal 628 with baseband frequency to output to A/D conversion section 607. A/D conversion section 607 converts the analogue signal 628 into digital signal 629 to output to allocating section 608.

Allocating section 608 divides digital signal 629 into signals 630 and 631 according to an instruction from control section 617 to output to correlation detection sections 609 and 610 respectively.

Correlation detection sections 609 and 610 despread divided signals 630 and 631 respectively to detect correlation of a received signal with a spreading code and obtain correlation values 632 and 633 respectively. Each spreading code may be instructed from control section 125. Detected correlation values 632 and 633 are respectively output to decoding sections 612 and 613, while output to control section 617.

Decoding sections 612 and 613 decode forward common control channel signals 634 and 635 using correlation values 632 and 633. At this point, when base station 100 executes an error correction coding for a forward link, an error correction decoding with deinterleaving processing is executed.

In addition, each common section may be provided to use for all channels according to time slots instead of using correlation detection sections 609 and 610, and decoding sections 612 and 613.

The following description will explain a manner how a mobile station acquires synchronization with a base station when it is turned on with reference to the case illustrated in FIG. 2 where a time slot to transmit a forward link common control channel signal including a synchronization control channel signal is provided once every four time slots with three other time slots inserted.

When mobile station 600 is turned on, it does not know an assignment and timing of time slots for reverse link and forward link because it does not acquire synchronization with a base station yet.

Figure 8:
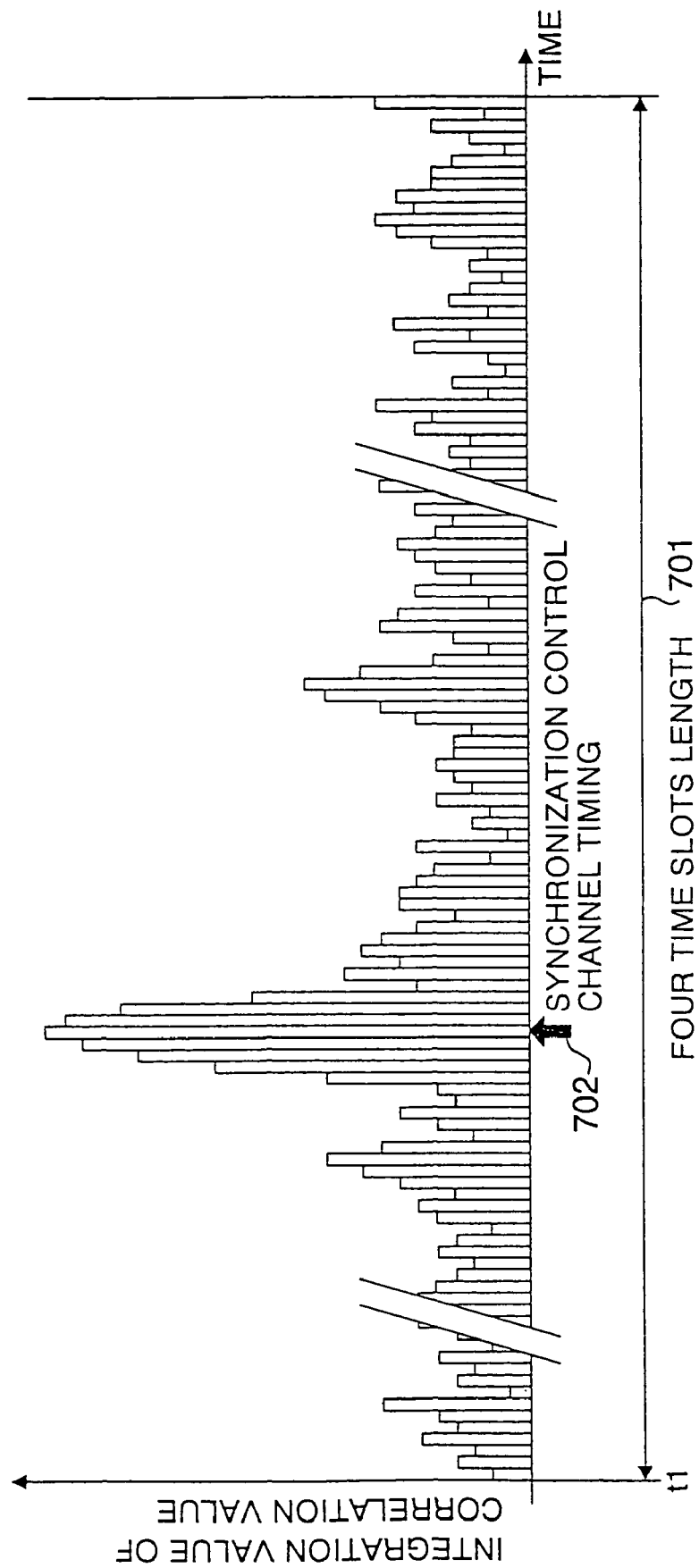
FIG. 8 is an integration result diagram obtained by the mobile station according to the fifth embodiment integrating correlation value of a received signal with a spreading code of a forward synchronization control channel at each sampling timing over four time slots interval starting from an arbitrary time.

Then mobile station 600, as illustrated in FIG. 8, integrates a correlation value of a received signal with a spreading code of forward link synchronization control channel at each sample timing within a four time slots length 701 starting from an arbitrary time t1 and repeats the integration at four time slots intervals.

When the number of integration times is increased, since noise component is reduced, it is detected that an integration value of correlation value at sampling timing 702 illustrated in FIG. 8 that conforms to a timing of the synchronization control channel signal becomes larger than that at other sampling timing.

However, as the number of integration times is too increased, a sampling timing by mobile station 600 shifts from the target timing because mobile station 600 does not acquire synchronization with the base station yet. Therefore too large number of integration times makes it difficult to detect timing 702 for synchronization control channel signal.

When common control channel signals including synchronization control channel signals are not provided at certain intervals, it is difficult to reduce the noise component by the integration described above, making it difficult to detect a timing of synchronization control channel signal.

However, when common control channel signals including synchronization control channel signals are provided at certain intervals even though the numbers of time slots assigned for reverse link and forward link are varied, it is possible to execute integration at the certain intervals, thus facilitating a detection of the timing of synchronization control channel signal.

In a configuration of mobile station 600 illustrated in FIG. 7, such synchronization acquisition by integration is executed in control section 617, however a synchronization section (not shown) may be provided besides control section 617.

As described above, according to the fifth embodiment, a mobile station detects a synchronization control channel signal by integrating correlation values of a received signal with a spreading code at predetermined time slots intervals, thereby making it possible to acquire synchronization with a base station easily with less time even when an assignment of time slots for forward and reverse links is changed correspondingly to an information volume in the case where the information volumes of forward and reverse links are asymmetry.

Sixth Embodiment

Figure 9:
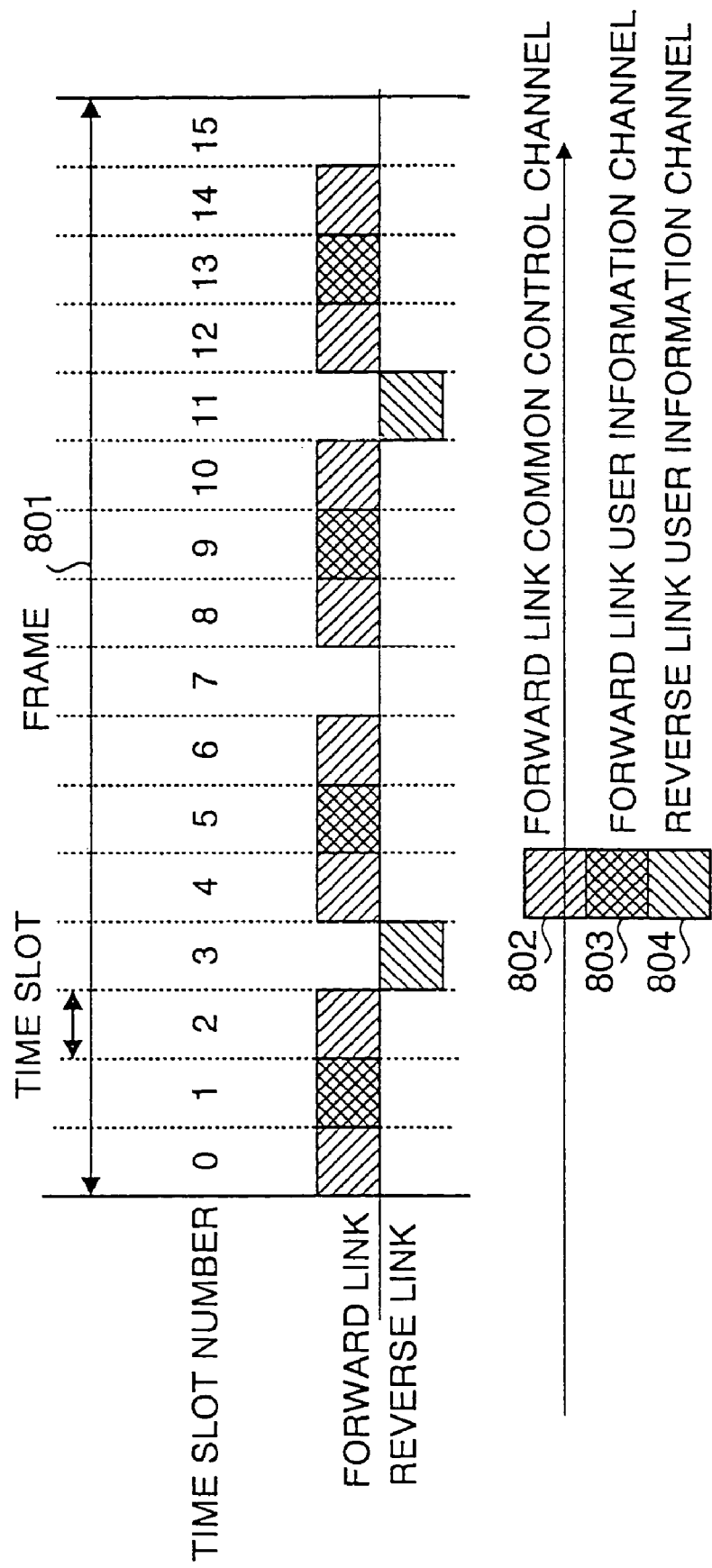
FIG. 9 is a frame diagram illustrating an assignment of time slots at a communication frame applied in a CDMA/TDD mobile communication system according to a sixth embodiment of the present invention.

FIG. 9 is a frame diagram illustrating an assignment of time slots at a communication frame applied in a CDMA/TDD mobile communication system according to the sixth embodiment of the present invention.

FIG. 9 illustrates an example where one frame 801 is divided into sixteen time slots 0 to 15. In FIG. 9, 802 indicates a time slot at which a forward link common control channel signal is provided, 803 indicates a time slot at which a forward link user information channel signal is provided, and 804 indicates a time slot at which a reverse link user information channel signal is provided.

In other words, one frame 801 is divided into sixteen time slots so as to provide forward link common control channel signals including synchronization control signals at the eight time slots 0, 2, 4, 6, 8, 10, 12 and 14, forward link user information channel signals at the time slots 1, 5, 9 and 13, and reverse link user information channel signals at the time slots 3 and 11.

The transmission power control operation of control section 617 in mobile station 600 illustrated in FIG. 7 is explained with reference to FIG. 9.

Since the forward link user information channel is an dedicated channel between a mobile station 600 and a base station, the transmission power is controlled so that reception quality at mobile station 600 meets a predetermined requirement.

On the other hand, since forward link common control channel is a common channel, the transmission power control is not performed based on a requirement of reception quality at mobile station 600. As a result, the reception quality sometimes deteriorates temporarily due to fading.

In the case of performing a transmission power control for reverse link under open-loop control, the similarity of propagation paths of reverse link and forward link is used. In this case, when a time interval between a forward link time slot to measure a reception quality and a revere link time slot to transmit, the similarity of propagation path conditions of reverse link and forward link becomes low, resulting in a reduction of accuracy of the transmission power control.

The high reception quality introduces a more accurate estimation of propagation path conditions, however the propagation path condition changes as an interval between reception and transmission is increased.

Taking the above problems into consideration, a propagation path condition is estimated by combining a reception quality at each time slot with an appropriate weight. In the case where the propagation path condition changes rapidly, a weight for a common control channel signal at the time slot 2 just before the time slot 3 to be transmitted is set high and weights for a common control channel signal or user information channel signal at the other time slots are set low. It may be performed that the weight for the common control channel signal at the time slot 2 is set at 1 and the weights for a common control channel signal or user information channel signal at the other time slots are set at 0.

On the other hand, in the case where the propagation path condition changes slowly, since it is possible to estimate the propagation path condition with a high accuracy, a weight for a user information channel signal at the time slot 1 is set high and weights for common control channel signals at the time slots 0 and 2 are set low. It may be performed that the weight for the user information channel signal at the time slot 1 is set at 1 and weights for common control channel signals at time slots 0 and 2 are set at 0.

In addition, the above case describes about the transmission power control of the reverse link user information channel signal at the time slot 3, however the same processing is performed to the transmission power control of the reverse link user information channel signal at the time slot 11.

The above case further describes about the example where three time slots just before the time slot to be transmitted are used to combine with weights, however it is also preferable to use forward link channel signals at time slots before the three time slots.

In this case, the above example corresponds to the case where weights for channel signals at time slots four time slots before the time slot to be transmitted are set at 0. In addition, the above case describes that forward user information channel signals are provided at forward link time slots except for forward link time slots at which common control channel signals are provided, however the same processing is performed in another case where forward link user information channel signals and forward link common control channel signals are provided at the same time slots.

Further, user information channel signals may be provided only at forward link time slots without being provided at reverse link time slots. This case corresponds to weights for user information channel signals being set at 0.

In addition, a propagation path condition is estimated by combining signals with weights in the above case, however it is also preferable to predict a propagation path condition via which a time slot will be transmitted using a time transition of the estimated propagation path condition to control transmission power.

Further, in the above case, the transmission power control is performed only under the open-loop control. However, the same processing is performed in the transmission power control under the combination of closed-loop control where a base station instructs transmission power to a mobile station via a forward link.

As described above, according to the sixth embodiment, a mobile station detects a synchronization control channel signal by integrating correlation values of a received signal with a spreading code at predetermined time slots intervals, thereby making it possible to acquire synchronization with a base station easily with less time even when an assignment of time slots for forward and reverse links is changed correspondingly to an information volume in the case where the information volumes of forward and reverse links are asymmetry.

Further, the mobile station measures a reception quality of a forward link common control channel signal provided at a time slot just before a time slot of a reverse link user information channel signal even though the reverse link user information channel signal is provided at any reverse link time slot, thereby enabling an effective open-loop controlled transmission power control even when a propagation path condition changes rapidly.

Seventh Embodiment

Figure 10:
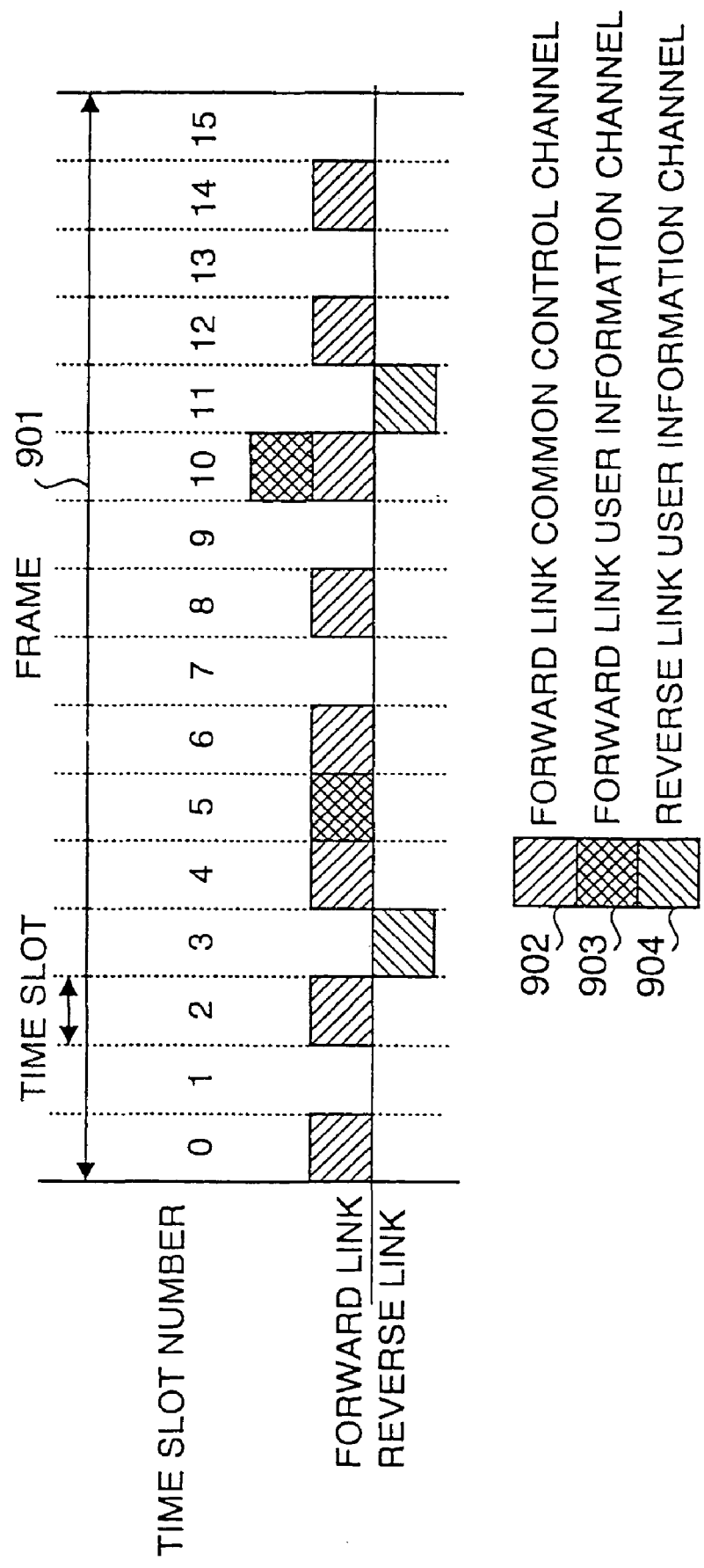
FIG. 10 is a frame diagram illustrating an assignment of time slots at a communication frame applied in a CDMA/TDD mobile communication system according to a seventh embodiment of the present invention.

FIG. 10 is a frame diagram illustrating an assignment of time slots at a communication frame applied in a CDMA/TDD mobile communication system according to the seventh embodiment of the present invention.

FIG. 10 illustrates an example where one frame 901 is divided into sixteen time slots 0 to 15. In FIG. 10, 902 indicates a time slot at which a forward link common control channel signal is provided, 903 indicates a time slot at which a forward link user information channel signal is provided, and 904 indicates a time slot at which a reverse link user information channel signal is provided.

In other words, one frame 901 is divided into sixteen time slots so as to provide forward link common control channel signals including synchronization control signals at the eight time slots 0, 2, 4, 6, 8, 10, 12 and 14, forward link user information channel signals at the time slots 5 and 10, and reverse link user information channel signals at the time slots 3 and 11.

The transmission power control operation of control section 617 in mobile station 600 illustrated in FIG. 7 is explained with reference to FIG. 10. In addition, the explanation will describe the case where a weight for forward link channel signal provided at a time slot just before a time slot to be transmitted is 1 and weights for the other forward link channel signals are 0.

A common control channel signal is provided at the time slot 2 just before the time slot 3 to be transmitted. Accordingly, the transmission power control is performed based on a reception quality of the forward link common control channel signal at the time slot 2.

On the other hand, both common control channel signal and user information channel signal are provided at the time slot 10 just before the time slot 11 to be transmitted. Accordingly, it is possible to perform the transmission power control based on both reception qualities of the forward link common control channel signal and user information channel signal.

Two correction detection sections are necessary to measure both reception qualities of the forward link common control channel signal and user information channel signal. However, a single correlation detection section is enough by providing a configuration where both reception qualities can be switched to measure.

In a configuration where a reception quality of the forward link common control channel signal is measured, the transmission power control is performed based on the reception quality of the forward link common control channel signal that has a lower accuracy, not depending on the time slot assignment of user information channel signal for forward and reverse links, even when a forward link user information channel signal is provided at a slot just before a slot at which a reverse link user information channel signal is provided.

Therefore, an effect of transmission power control is decreased. However, by providing a configuration where a channel to measure a reception quality is switched to a user information channel when a forward link user information channel signal is provided at a slot just before a slot at which a reverse link user information channel signal is provided, it is possible to measure the reception quality of the user information channel signal measurable with a high accuracy, thereby enabling an effective transmission power control of the reverse link user information channel signal.

As described above, according to the seventh embodiment, a mobile station detects a synchronization control channel signal by integrating correlation values of a received signal with a spreading code at predetermined time slots intervals, thereby making it possible to acquire synchronization with a base station easily with less time even when an assignment of time slots for forward and reverse links is changed correspondingly to an information volume in the case where the information volumes of forward and reverse links are asymmetry.

Further, the mobile station switches a reception quality of a forward link common control channel signal and that of a forward link user information signal provided at a time slot just before a time slot of a reverse link user information channel signal even though the reverse link user information channel signal is provided at any reverse link time slot, thereby enabling an effective open-loop controlled transmission power control even when a propagation path condition changes rapidly.

As been obvious from the above-mentioned explanation, according to the present invention, it is possible for a mobile station to reduce a acquisition time of synchronization with a base station even when an assignment of time slots for forward and reverse links is changed corresponding to an information volume in the case where the information volumes of forward and reverse links are asymmetry, thereby enabling the open-loop controlled transmission power control to function effectively.

This application is based on the Japanese Patent Application No. HEI10-78317 filed on Mar. 10, 1998, entire content of which is expressly incorporated by reference herein.

What is claimed is:

1. A mobile station apparatus for use in a CDMA/TDD mobile communication system in which a communication frame comprising a plurality of time slots including a plurality of forward link time slots and at least one reverse link time slot is employed, the mobile station apparatus comprising:
   a receiver that receives the communication frame;
   a measurer that measures a reception quality of each of the plurality of forward link time slots in the received communication frame including time slots to which a common control channel is assigned;

a controller that increases a weight of the reception quality of a forward link time slot when a time interval between the forward link time slot and a reverse link time slot for which transmission power control is preformed decreases; and a transmission power controller that performs transmission power control for the reverse link time slot, according to the reception quality of which the weight is increased by the controller.

2. The mobile station apparatus according to claim 1, wherein:

when propagation path conditions change rapidly, the controller increases the weight of the reception quality of the forward link time slot having a minimum time interval to the reverse link time slot; and when the propagation path conditions change slowly, the controller increases the weight of the reception quality of the forward link time slot that is assigned to a same channel as a channel assigned to the reverse link time slot.

3. The mobile station apparatus according to claim 1, wherein the transmission power controller combines the reception quality of which the weight is increased, to estimate propagation path conditions, and to perform an open loop transmission power control.

4. The mobile station apparatus according to claim 1, wherein the controller decreases a weight of the reception quality of the forward link time slot when the time interval between the forward link time slot and the reverse link time slot increases.

5. A transmission power control method for use in a CDMA/TDD mobile communication system in which a communication frame comprising a plurality of time slots including a plurality of forward link time slots and at least one reverse link time slot is employed, the transmission power control method comprising:

receiving the communication frame;

measuring a reception quality of each of the plurality of forward link time slots in the received communication frame including time slots to which a common control channel is assigned;

increasing a weight of the reception quality of a forward link time slot when a time interval between the forward link time slot and a reverse link time slot for which transmission power control is performed decreases; and performing transmission power control for the reverse link time slot, according to the reception quality of which the weight is increased.

* * * * *